(12) United States Patent
Seen et al.

(10) Patent No.: US 9,569,896 B2
(45) Date of Patent: Feb. 14, 2017

(54) GLASS TYPE MOBILE TERMINAL

(71) Applicant: LG ELECTRONICS INC., Seoul (KR)

(72) Inventors: Seungmin Seen, Seoul (KR); Kyunghee Yoo, Seoul (KR); Anna Yoo, Seoul (KR); Jongpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/567,643

(22) Filed: Dec. 11, 2014

(65) Prior Publication Data
US 2015/0332502 A1    Nov. 19, 2015

(30) Foreign Application Priority Data

May 15, 2014  (KR) .................. 10-2014-0058431

(51) Int. Cl.
*G06T 19/00*     (2011.01)
*G02B 27/01*     (2006.01)
(Continued)

(52) U.S. Cl.
CPC ......... *G06T 19/006* (2013.01); *G02B 27/0172* (2013.01); *G06F 1/163* (2013.01);
(Continued)

(58) Field of Classification Search
CPC ............... G06T 19/006; G02B 27/0172; G02B 2017/0178; H04N 9/3141; G06F 3/0416; G06F 1/163
(Continued)

(56) References Cited

U.S. PATENT DOCUMENTS 5,572,343 A    11/1996  Okamura et al.
8,194,036 B1    6/2012  Braun et al.
(Continued)

FOREIGN PATENT DOCUMENTS

EP         2728397         5/2014
WO      2013/136696        9/2013
(Continued)

OTHER PUBLICATIONS

European Patent Office Application Serial No. 142006485, Search Report dated Oct. 26, 2015, 7 pages.
(Continued)

*Primary Examiner* — Gregory J Tryder
*Assistant Examiner* — Michael Le
(74) *Attorney, Agent, or Firm* — Lee, Hong, Degerman, Kang & Waimey

(57) ABSTRACT

A glass type mobile terminal is provided. The mobile terminal includes a band frame wearable on a user's head, a light transmissive lens coupled to the band frame to be located in front the user wearing the band frame, the light transmissive lens comprising a transparent screen where an image is focused, a projector for outputting an image toward the transparent screen from a lateral surface of the light transmissive lens, a photo shutter coupled to a front surface of the lens, with a controllable transparency, and a controller for controlling the transparency of the photo shutter, such that the visibility of the image focused on the light transmissive lens may be enhanced by controlling the transparency of the light transmissive lens, using the photo shutter, that a clear image may be seen even in a bright place.

18 Claims, 12 Drawing Sheets

(51) Int. Cl.
   *H04N 9/31*   (2006.01)
   *G06F 3/041*  (2006.01)
   *G06F 1/16*   (2006.01)

(52) U.S. Cl.
   CPC ......... *G06F 3/0416* (2013.01); *H04N 9/3141* (2013.01); *G02B 2027/0178* (2013.01)

(58) Field of Classification Search
   USPC .............................. 345/633, 8; 351/131, 132
   See application file for complete search history.

(56) References Cited

U.S. PATENT DOCUMENTS

| | | |
|---|---|---|
| 2005/0225868 A1 | 10/2005 | Nelson et al. |
| 2006/0001655 A1* | 1/2006 | Tanabe ................... G06F 3/044 345/176 |
| 2008/0191978 A1* | 8/2008 | Miles ................... G01L 5/0047 345/84 |
| 2009/0040308 A1* | 2/2009 | Temovskiy ............... F41G 3/16 348/158 |
| 2010/0182273 A1* | 7/2010 | Noguchi ............. G02F 1/13338 345/174 |
| 2010/0201897 A1 | 8/2010 | Saitoh et al. |
| 2011/0221656 A1 | 9/2011 | Haddick et al. |
| 2012/0154557 A1 | 6/2012 | Perez et al. |
| 2013/0181888 A1* | 7/2013 | Kuriya ................. G02B 27/017 345/8 |
| 2013/0214998 A1* | 8/2013 | Andes ................. G02B 27/017 345/8 |
| 2013/0222410 A1* | 8/2013 | Kameyama .......... H04N 13/044 345/589 |
| 2013/0258270 A1 | 10/2013 | Cazalet et al. |
| 2013/0300637 A1* | 11/2013 | Smits ..................... G03B 35/18 345/8 |
| 2013/0321462 A1* | 12/2013 | Salter ..................... G06F 1/163 345/633 |
| 2013/0335404 A1 | 12/2013 | Westerinen et al. |

FOREIGN PATENT DOCUMENTS

| | | | |
|---|---|---|---|
| WO | 2014/002348 | 1/2014 | |
| WO | WO 2015076812 A1 * | 5/2015 | ......... G02B 27/0101 |

OTHER PUBLICATIONS

European Patent Office Application Serial No. 14200648.5, Search Report dated Feb. 4, 2016, 19 pages.

* cited by examiner

GLASS TYPE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2014-0058431, filed on May 15, 2014 in Korea, the contents of which is hereby incorporated by reference herein in its entirety.

FIELD OF THE INVENTION

Embodiments of the present disclosure relates to a glass type mobile terminal including a camera and a light transmissive lens, which may acquire and use information easily, while living a daily life.

RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, interests in wearable mobile terminals are increasing because they have convenient usage. Researches and developments are ongoing for diverse wearable typed mobile terminals which can be put on human body parts or clothes (e.g., glasses, bracelets, watches and so on).

SUMMARY OF THE INVENTION

An object of the present disclosure is to provide a wearable glass type mobile terminal which may enhance visibility of an image focused on a transparent screen provided therein.

To achieve these objects and other advantages and in accordance with the purpose of the disclosure, as embodied and broadly described herein.

Embodiments of the present disclosure may provide a glass type mobile terminal includes a band frame wearable on a user's head; a light transmissive lens coupled to the band frame to be located in front the user wearing the band frame, the light transmissive lens comprising a transparent screen where an image is focused; a projector for outputting an image toward the transparent screen from a lateral surface of the light transmissive lens; a photo shutter coupled to a front surface of the lens, with a controllable transparency; and a controller for controlling the transparency of the photo shutter.

The glass type mobile terminal may further include a touch sensor coupled to the front surface of the light transmissive lens to sense capacity change so as to receive an input touch signal.

The transparency of the photo shutter may be controlled based on the number of the touches input to the touch sensor.

The controller may control transparency of a portion of the photo shutter where the touch input is sensed by the touch sensor.

The controller may control the transparency of the photo shutter to be lowered, when a touch and drag input is sensed by the touch sensor in a first direction, and to be heightened, when a touch and drag input is sensed by the touch sensor in a second direction.

The photo shutter may include a first transparent glass having a first transparent electrode formed in one surface thereof; a second transparent glass having a second transparent electrode formed in the other surface thereof, with spaced apart from one surface of the first electrode layer; a liquid crystal layer having liquid crystals filled between the first and second transparent glasses; a first polarizing plate coupled to the first transparent glass to arrange lights in one direction; and a second polarizing plate coupled to the second transparent glass to arrange lights in a vertical direction with respect to the first polarizing plate.

The glass type mobile terminal may further include a third transparent electrode formed in an opposite surface of a surface where the second transparent electrode of the second transparent glass is formed or the first polarizing plate, wherein the controller determines presence of a touch input by sensing capacity change between the first transparent electrode and the second transparent electrode.

The controller may control arrangement of liquid crystals by applying a signal to the first transparent electrode and the second transparent electrode at preset intervals, and determine presence of a touch input by sensing capacity change between the first transparent electrode and the second transparent electrode, when the first transparent electrode and the second transparent electrode are not used for control of the liquid crystal arrangement.

The photo shutter may include PDLC (Polymer Dispersed Liquid Crystal).

The glass type mobile terminal may further include a proximity illumination sensor for sensing light nearby, wherein the controller controls the transparency of the photo shutter based on illumination sensed by the proximity illumination sensor.

A control rate of the transparency when the illumination is high may be higher than a control rate of the transparency when the illumination is low.

The photo shutter selectively may control transparency possessed by each of divided portions.

The controller may control the photo shutter to lower transparency of a text portion of the image than transparency of the other portion.

The glass type mobile terminal may further include a video output unit for providing an image from a lateral surface of the light transmissive lens.

The transparent screen is tilted to transmit an image incident from the lateral surface of the light transmissive lens.

The glass type mobile terminal may further include an acceleration sensor, wherein the controller heightens transparency of the photo shutter, when the acceleration sensor senses movement for a preset time or more in a state of lowering the transparency of the photo sensor, and the controller lowers the transparency of the photo shutter again, when the acceleration sensor does not sense the movement in a preset time or more.

The glass type mobile terminal may further include a touch pad coupled to the band frame to be located in the user's side, wherein the controller controls the image to have a pointer moving in response to the touch input, when the user's touch input to the touch pad is sensed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
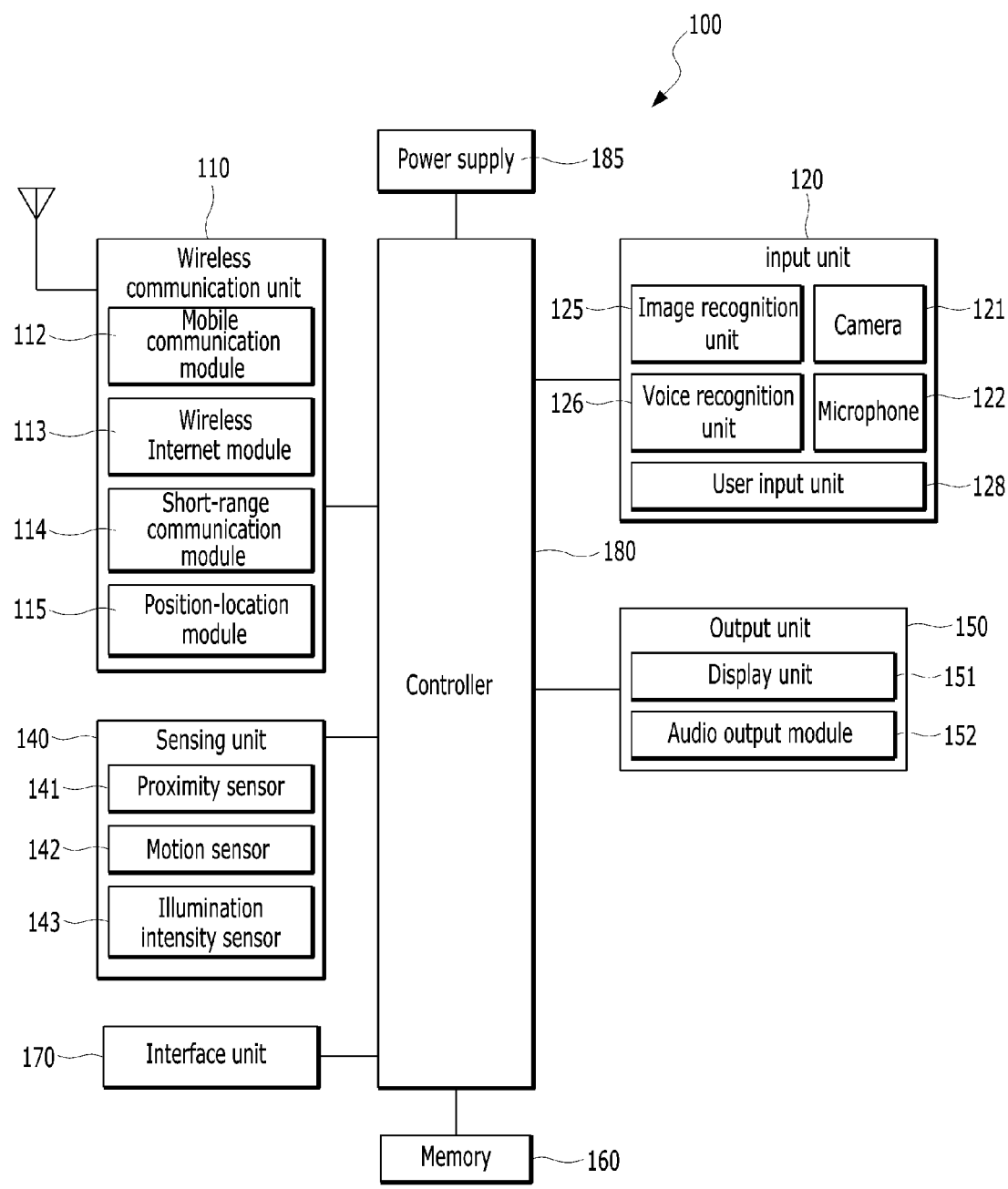
FIG. 1 is a block diagram of a mobile terminal in accordance with the present disclosure.

Reference is now made to FIG. 1, where FIG. 1 is a block diagram of a mobile terminal in accordance with the present disclosure.

Referring now to FIG. 1, the glass type mobile terminal 100 is shown having wireless communication unit 110 configured with several commonly implemented components. For instance, the wireless communication unit 110 typically includes one or more components which permit wireless communication between the glass type mobile terminal 100 and a wireless communication system or network within which the mobile terminal is located.

In the following description, the above elements of the glass type mobile terminal 100 are explained in sequence.

First of all, the wireless communication unit 110 typically includes one or more components which permits wireless communication between the glass type mobile terminal 100 and a wireless communication system or network within which the mobile terminal 100 is located. For instance, the wireless communication unit 110 can include a mobile communication module 112, a wireless internet module 113, a short-range communication module 114, a position-location module 115 and the like.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation)

by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the glass type mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

An image recognition unit 125 is a device configured to extract information from an image photographed by the camera 121 and the image recognition unit 125 may identify the photographed image. In case the photographed image has a character, the image recognition unit converts a character into text data. In case the image has a plurality of objects, the image recognition unit extracts an object which will be compared with information stored in the memory 160.

In case the camera 121 photographs a motion picture, the motion picture consists of still images and the image recognition unit 125 acquires information of all the still images and the controller processes the acquired information. However, this process might be unnecessary waste. In addition, if such unnecessary information is extracted and provided to a user, it is inconvenient of a user to use a glass type mobile terminal 100 wearable like glasses.

When the user presses the user input unit 128 provided in the frame or uses a voice command for acquiring image information, the user can extract necessary information. Alternatively, when looking at one object for more than a preset time period, the camera 121 may photograph the same object for more than a preset time period and information on the object may be extracted.

Alternatively, when the user approaches a specific object, the object occupies a large area of the user's view and it can be determined that the user is looking at the corresponding object. Hence, when one object of the images recognized by the camera 121 occupies a preset range of images composing the motion picture, information on the object may be extracted.

Alternatively, the image recognition unit 125 may recognize a gesture created by the user and processes the input gesture as a user command. For example, the image recognition unit 125 may recognize a circle drawn by the user as "yes" or perform a function of selecting a character or object located in the circle.

A voice recognition unit 126 may convert the user's voice inputted via the microphone 1222 into text data or recognize the user's voice as a specific command (hereinafter, "a voice command"). As the glass type mobile terminal 100 according to the present invention can include a keyboard, a function of the voice recognition unit 126 configured to recognize the user's voice command is important so as to activate the functions of the mobile terminal.

It is difficult for the glass type mobile terminal 100 to include the keyboard. However, the glass type mobile terminal 100 may include a button type user input unit 128 on the frame and a command used frequently may be inputted via the button type user input unit 128. For example, the user can input a command for photographing an image watched by the user or extracting information from the image or a command for controlling a volume of a sound outputted from the audio output unit 152 via the button type user input unit 128.

Various types may be applicable as the user input unit 128 and such various types includes a module for recognizing a physical pressure from a metallic dome formed therein to generate a signal.

The sensing unit 140 senses a state of the glass type mobile terminal 100 and a user surrounding environment and such the sensing unit 140 may include a gyro sensor 141 and an acceleration sensor 142.

The gyro sensor 141 is a device configured to sense a tilted phase of the mobile terminal and tilted variation in x, y and z axes, and it can be called as an angular velocity sensor. The gyro sensor senses a rotational movement with respect to each axis to sense tilting and shaking of the mobile terminal case.

A conventional gyro sensor has a spinning top, with three axes and such a gyro sensor is developed to have an improved precision and a compact size such as an optical gyro sensor or a vibration gyro sensor recently, such that a current developing gyro sensor can be mountable in compact-sized electronics including a mobile terminal. In addition, 6-axis sensor realized by MEMS module can be used as the gyro sensor 141.

The gyro sensor 141 applied to the present invention is not limited to those types mentioned above and all types of gyro sensors capable of sensing tilting and motion of the glass type mobile terminal 100 can be applicable to the present invention.

The acceleration sensor 142 may measure a dynamic force, for example, an acceleration of the glass type mobile terminal 100 and it can detect vibration, shocks and so on from acceleration change. When an object having mass is accelerated, a force is generated and variation of the force is sensed by the acceleration sensor 142.

When using the acceleration sensor 142, the user's movement can be sensed and it can be determined whether the mobile terminal is moving or stationary. Once it is sensed by the acceleration sensor 142 that the user is walking or moving, the controller 180 may limit the output of images from the image output unit 151 and an accident happening while a walking user is watching a video file may be prevented.

Next, the output unit 150 is employed to generate outputs related with a visual, auditory or tactile sense. The output unit 150 may include a video output unit 151 and an audio output unit 152.

The video output unit 151 includes a projector 1510 for outputting an image, using video information, and a light transmissive lens 1511 disposed in front of the user's eyes to provide the user with the light supplied by the projector 1510.

The light transmissive lens 1511 is disposed in front of the user's eyes, like lenses of glasses. A transparent screen 1515 is provided in the light transmissive lens 1511. The transparent screen is transparent to allow the user to see an object located in front and to reflect and make the image incident in a lateral direction reach the user's eyes.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, receivers, bone conduction audio producing devices, and combinations thereof.

In the memory 160 may be stored programs configured for the controller 180 to process and control and to implement a function for temporarily storing input/output data. The memory 160 may store new input data therein and extract the stored data. A storage function of the memory 160 may be expanded by an SD card or an auxiliary storage device.

The interface unit 170 is employed as a passage to all of external devices connected with the glass type mobile terminal 100. The interface unit 170 may be provided with data or an electric power from an external device to transmit the provided data or power to each of the components provided in the glass type mobile terminal 100 or the data stored in the glass type mobile terminal 100 to an external device.

Examples of the interface unit 170 may include a wire/wireless headset port, an external charger port, a wire/wireless data port, a memory card port, a port for connecting a device having an identification module, an I/O (Input/Output) port, a video I/O (Input/Output) port, an earphone port and the like.

The identification module is a chip in which diverse information for user identify of the glass type mobile terminal 100. Examples of the identification module may include UIM (User Identify Module), SIM (Subscriber Identity Module), USIM (Universal Subscriber Identity Module) and the like. The device having the identification module (hereinafter, "the identification device") may be fabricated as a smart card and the identification device may be connected with the mobile terminal 100 via a port.

When the mobile terminal 100 is connected with an external cradle, the interface unit 170 may be a passage of the power from a cradle to the mobile terminal 100 or a passage of various command signals input from the cradle by the user to the mobile terminal. The various command signals or power input from the cradle may be operating as a signal for recognizing whether the mobile terminal is mounted on the cradle precisely.

The controller 180 typically controls overall operations of the glass type mobile terminal 100. The controller 180 controls the wireless communication unit to transmit and receive diverse signals or to process the input data or it controls the light transmissive lens 1511 and the audio output unit to provide the user with information. The image recognition unit 125 and the voice recognition unit 126 mentioned above may be configured as a part of the controller 180.

The controller 180 in accordance with the present disclosure may extract information from the image acquired by the camera 121 and compare the extracted information with pre-stored information or store the extracted information in the memory 160. Or, the controller 180 may extract the related information stored in the memory 160 and output the extracted information to the light transmissive lens 1511 or search for the related information on the internet.

The power supply unit 190 provides power required by the various components for the glass type mobile terminal 100. The power may be internal power, external power, or combinations thereof.

A battery may include a built-in rechargeable battery and may be detachably attached to the terminal body for a charging and the like.

Various embodiments described herein may be implemented in a computer-readable medium using, for example, computer software, hardware, or some combination thereof.

Figure 2:
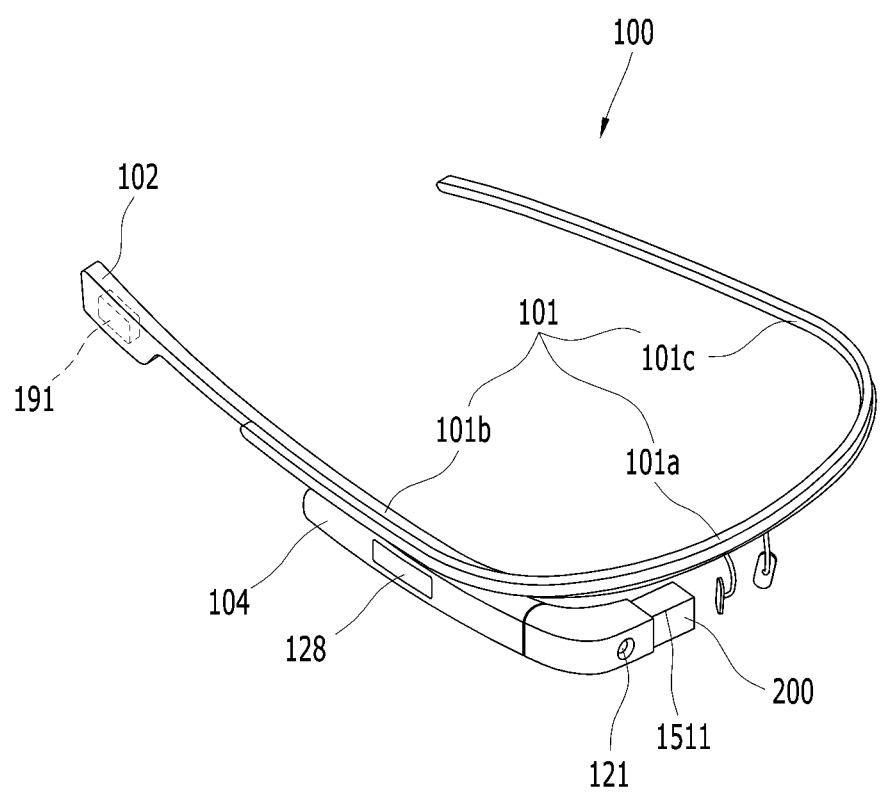
FIG. 2 is a perspective diagram of a glass type mobile terminal in accordance with one embodiment of the present disclosure.

FIG. 2 is a perspective diagram of a front surface provided in the glass type mobile terminal 100 in accordance with the first embodiment of the present disclosure. Referring to FIG. 2, the glass type mobile terminal 100 of the present disclosure includes a band frame 101, a housing 102 and 104, a light transmissive lens 1511 and a camera 121.

The band frame 101 includes a front portion 101a disposed in an upper portion with respect to the user's eye and a lateral portion 101b extended from the front portion 101a toward the user's ears. The band frame 101 is worn on the user's head, with the front portion 101a and the lateral portion 101b surrounding a front part and a lateral part of the user's head.

The band frame 101 has to be wearable on anyone's head, regardless of the head size, and it may be formed of an elastic material (e.g., metal and transformable plastic).

In case it is partially formed of a metallic material, the band frame 101a may have a clean appearance and looks thin effectively. In addition, the metallic part of the band frame 101 may be used as an antenna.

The housing 102 and 104 is coupled to the lateral portion 101b of the band frame 101. In the housing 102 and 104 are provided a controller 180, a battery 191, a wireless communication unit 110, a projector (1410, see FIG. 4), the camera 121 and the voice output unit 152. In the FIG. 2, the housing 102 and 104 is coupled to a predetermined portion of the band frame 101b. The housing may be coupled to the other opposite portion 101c of the band frame 101.

Especially, the projector 1510 mentioned above may be provided in a housing 104 arranged adjacent to the front portion 101a, to provide an image to the light transmissive lens 1511. The light transmissive lens 1511 may be directly coupled to the band frame 101. However, the light transmissive lens 1511 may be coupled to the band frame 101 through the housing 104 as shown in FIG. 2.

The light transmissive lens 1511 is coupled to the band frame 101 or the housing 104, to be located in front of the user's eyes when the user wears the glass type mobile terminal 100 on the head. The light transmissive lens 1511 may be large enough to cover all portions of the user's eyes. As shown in FIG. 2, the light transmissive lens 1511 may be located in an area a little higher than the eye.

Figure 3:
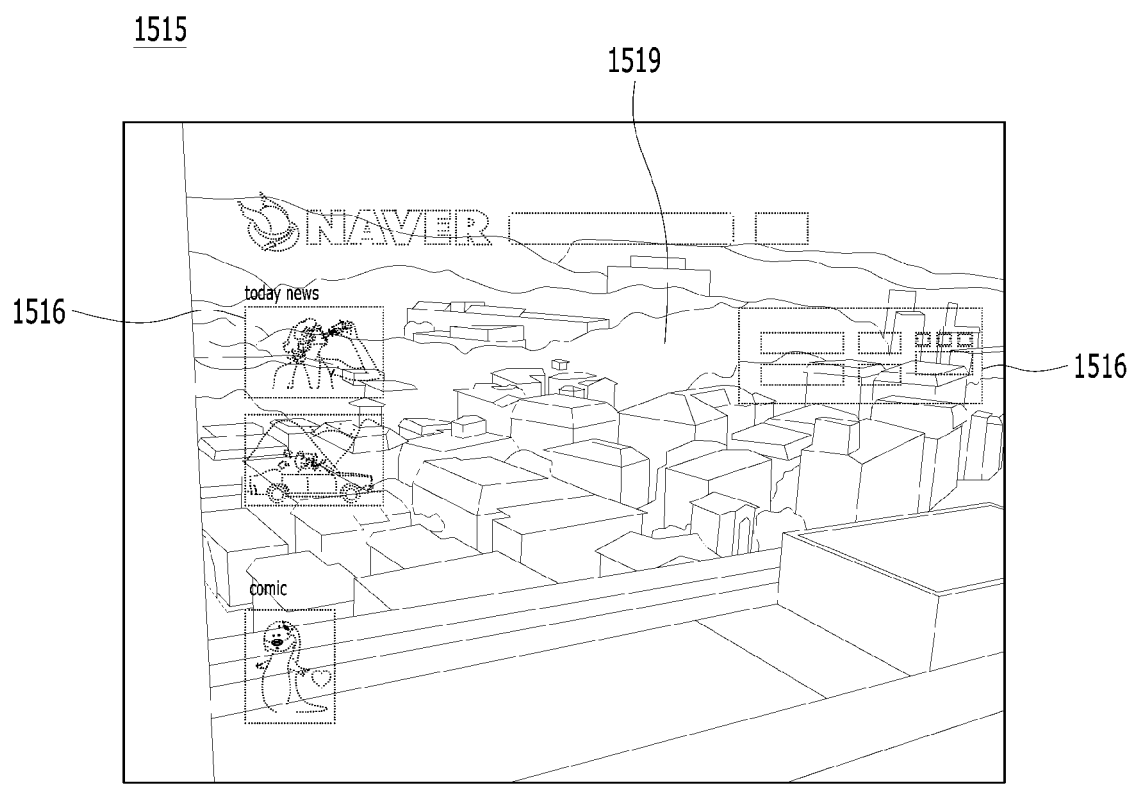
FIG. 3 is a diagram illustrating an image focused on a light transmissive lens provided in a glass type mobile terminal in accordance with one embodiment of the present disclosure.
Figure 4:
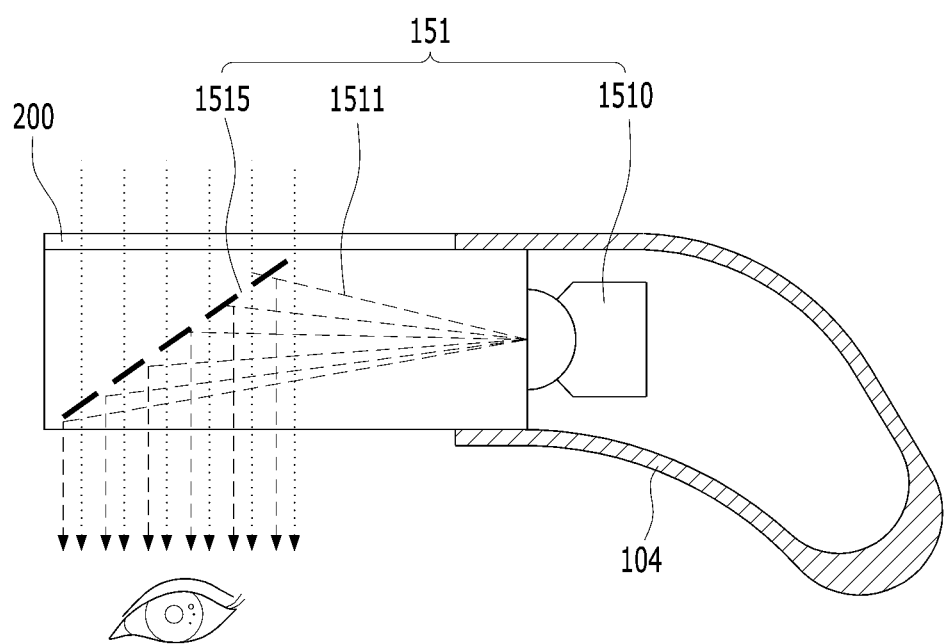
FIGS. 4 and 5 are sectional diagrams illustrating a light transmissive lens, a photo shutter and a projector provided in a glass type mobile terminal in accordance with one embodiment of the present disclosure.
Figure 5:
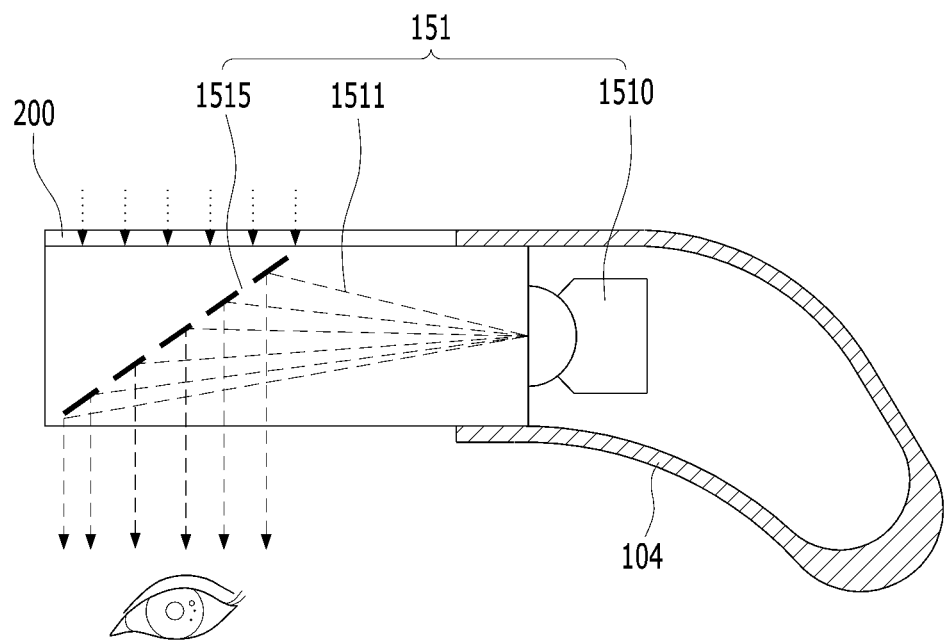

FIG. 3 is a diagram illustrating an image focused on the light transmissive lens 1511 of the glass type mobile terminal 100 in accordance with the first embodiment of the present disclosure. FIGS. 4 and 5 are sectional diagrams illustrating the light transmissive lens 1511, a photo shutter 200 and the projector 1510 provided in the glass type mobile terminal 100 in accordance with the first embodiment of the present disclosure.

The light transmissive lens 1511 transmits light there through. When the user wears the glass type mobile terminal 100 on the head, an object and a view located in front of the user may meet the user's eyes through the light transmissive lens 1511.

The projector 1510 provided in a lateral surface of the light transmissive lens 1511 supplies an image (or light) based on image information and the image supplied from the lateral surface is focused on the transparent screen 1515. The image focused on the transparent screen 1515 is seen by the user. The transparent screen 1515 may be realized as the light transmissive lens 1511 formed of two transparent materials with a different refractive index. In other words, a border surface between the two materials may be a transparent screen 1510 which reflects lights.

Accordingly, an object or scenery 1519 located in front of the light transmissive lens 1511 meets the user's eyes and an image 1516 supplied from the flanking projector 1510 is reflected on the transparent screen 1515 to be incident on the user's eyes simultaneously, such that two images may be seen as overlapped.

As the two images 1516 and 1519 are seen as overlapped, it is difficult for the user to recognize the image 1516 supplied from the projector 1510 properly and it is necessary to block the light 1519 incident in a forward direction so as to make the image 1516 supplied from the projector 1510 seen clearly.

To meet the necessity, the glass type mobile terminal according to the present disclosure may include a photo shutter 200 provided in a front surface of the light transmissive lens 1511 and the photo shutter 200 has a variable transparency. The transparency of the photo shutter 200 is variable to selectively block the light incident from the front surface of the light transmissive lens 1511. Accordingly, in a state where the photo shutter 200 is transparent, an object or scenery located in front is seen as shown in FIG. 3 and in a state where the photo shutter 200 is opaque, the image 1516 supplied from the projector 1510 may be seen clearly as shown in FIG. 5.

Figure 6A:
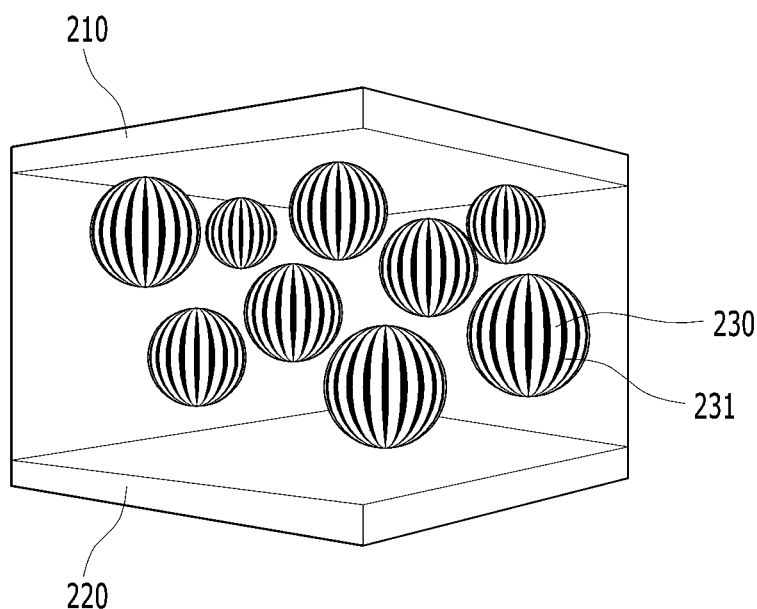
FIGS. 6(a) to 6(b) and 7(a) to 7(c) are diagrams illustrating a photo shutter provided in a glass type mobile terminal in accordance with one embodiment of the present disclosure.
Figure 6B:
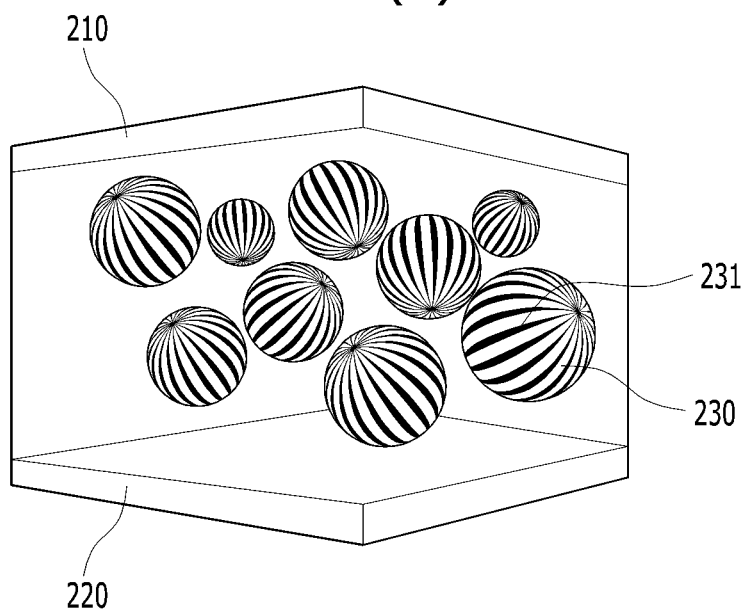

FIGS. 6(*a*) to 6(*b*) and 7(*a*) to 7*c* are diagrams illustrating the photo shutter 200 of the glass type mobile terminal 100 in accordance with the embodiment of the present disclosure. FIG. 6 illustrates one embodiment using PDLC (Polymer Dispersed Liquid Crystal). PDLC 230 is characterized to control transmittance of light based on a scattering strength of light, only to omit a polarizing plate. Compared with a conventional liquid crystal, PDLC can realize a high degree of visibility and a high response speed. In addition, PDLC can reduce the cost of a liquid crystal material.

Several millimeters of liquid crystal particle elements 231 are scattered in polymer and liquid crystal particles 231 are provided in a net-shaped polymer. As shown in FIG. 6 (*a*), liquid crystal particles 231 are in irregular directions, without a voltage, and a refractive index of the liquid crystal particles with respect to a media causes scattering in another interface. When a voltage is applied as shown in FIG. 6 (*b*), directions of liquid crystal particles are arranged uniformly and the refractive indexes match exactly to be in a transmission state.

Figure 7:
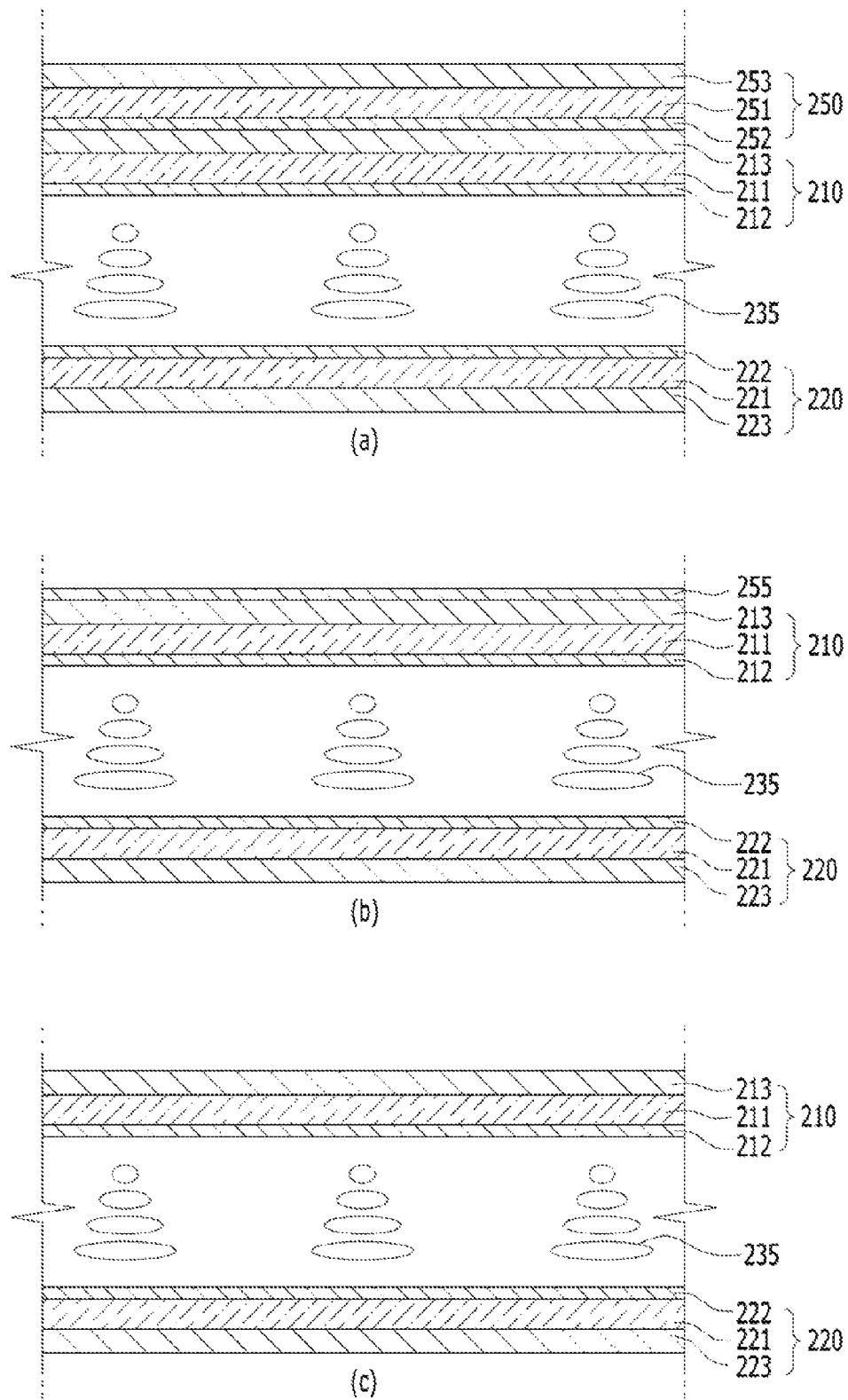

The photo shutter 200 shown in FIG. 7*a* is formed of liquid crystals filled between a pair of transparent electrode layers 210 and 220 having transparent electrodes 212 and 222, respectively. Arrangement of liquid crystals are changed by an electromagnetic field formed between a first transparent electrode 212 disposed on a front surface (an upper surface in the drawing) of the photo shutter 200 and a second transparent electrode 222 formed on a rear surface (a lower surface in the drawing).

A crystal type shown in FIG. 7*a* requires polarizing plates 213 and 223, which is different from the PDLC mentioned above. A first polarizing plate 213 coupled to a first glass 211 provided in a front surface lies at right angles to a second polarizing plate 223 coupled to a second glass 221 provided in a rear surface. When the liquid crystals 235 are arranged uniformly after the electric power applied to the first transparent electrode 212 and the second transparent electrode 222, the polarizing plates 213 and 223 lying at right angles to each other may stop light from transmitting there through. In contrast, when the power is not applied, the arrangement of the liquid crystals 235 is not uniform and a direction of a light wavelength is bending while transmitting the liquid crystals and the light can transmit the polarizing plates 213 and 223 lying at right angles to each other. The glass 211 and 221 may be formed of glass or transparent resin and the transparent electrode 212 and 222 disposed in the glass 211 and 221 may be formed of ITO.

A touch sensing function may be provided to the photo shutter 200 to perform user inputs generated by the user's touch of the light transmissive lens 1511. As shown in FIG. 7*a*, a touch sensor 250 (251, 252 and 253) is disposed on a front surface of the photo shutter 200 to realize a touch function. To realize a reduced thickness and to reduce material costs, the transparent electrodes 212 and 222 of the photo shutter 200 may be used as transparent electrodes of the touch sensor 250 at the same time (see FIGS. 7*b* and 7*c*).

In one embodiment of the photo shutter 200 shown in FIG. 7*b*, a third transparent electrode 255 is further provided which is disposed on a front surface of the photo shutter 200. The third transparent electrode 255 disposed on the front surface and the first transparent electrode 212 disposed in the first glass 211 are employed as the touch sensor. The first transparent electrode of the first glass and the second transparent electrode 222 of the second glass 221 are employed as the photo shutter 200.

The touch sensor recognizes that a touch is generated once a capacity formed between two electrodes changes. The first transparent electrode 212 is connected to the power for touch operation and the third transparent electrode 222 reads capacity change, only to recognize touch.

In one embodiment of the photo shutter 200 shown in FIG. 7*c*, the first transparent electrode 212 and the second transparent electrode 222 not only change the arrangement of the liquid crystals for the function as the photo shutter 200 but also performs the function of the touch sensor. Except the time taken to realize the function of the photo shutter 200, a signal for touch sensing is generated and a touch function is realized simultaneously.

Figure 8:
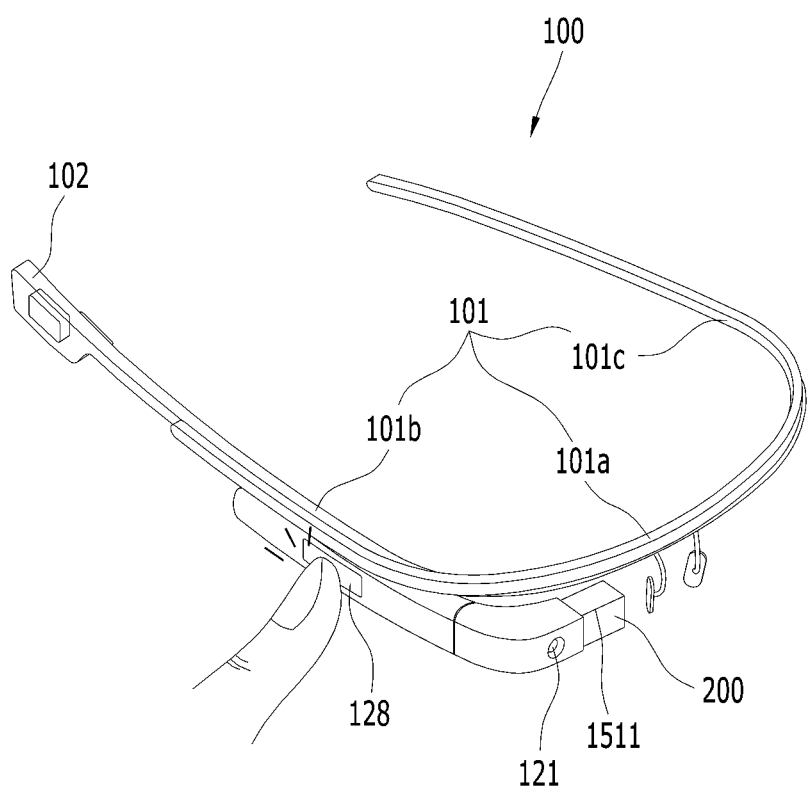
FIGS. 8 and 9 are diagrams illustrating a control method of a glass type mobile terminal in accordance with various embodiments of the present disclosure.
Figure 9:
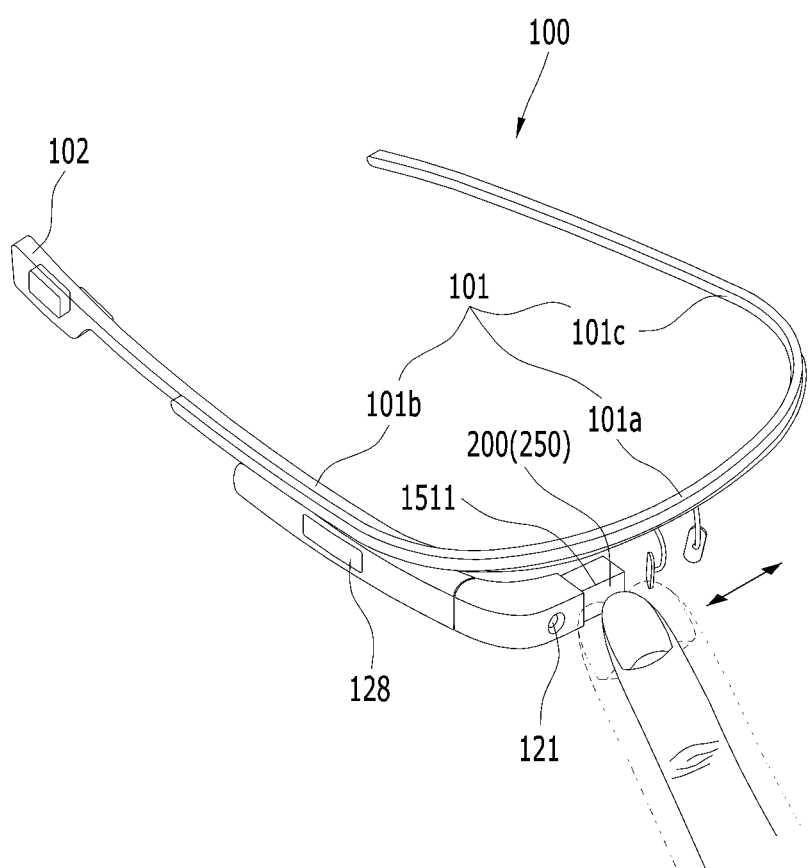

FIGS. 8 and 9 are diagrams illustrating embodiments of a method for controlling the glass type mobile terminal 100 in accordance of the embodiment of the present disclosure. Using the user input unit 128 provided in a lateral side of the glass type mobile terminal 100, the photo shutter 200 may be driven. Using the touch sensor 250 provided in the front surface of the photo shutter 200, the photo shutter 200 may be driven as shown in FIG. 9.

The user input unit 128 provided in the lateral surface may be realized by the touch sensor. Alternatively, the user input unit 128 may be realized by a button using a metallic dome, a slide key or diverse user input types. In case of using the touch sensor, touch or touch and drag may be applied as a command for driving the photo shutter 200.

A level of transparency may be controlled based on the number of times being touched (hereinafter, the number of touches) and the transparency may be adjusted based on a dragged distance or direction. For example, when a touch and drag input is sensed in a first direction, a transparency of the photo shutter 200 is lowered. When a touch and drag input is sensed in a second direction, the transparency of the photo shutter 200 is heightened.

In case of using the touch sensor coupled to the front surface of the photo shutter 200, transparency of a touched portion of the photo shutter 200 may be controlled.

Figure 10A:
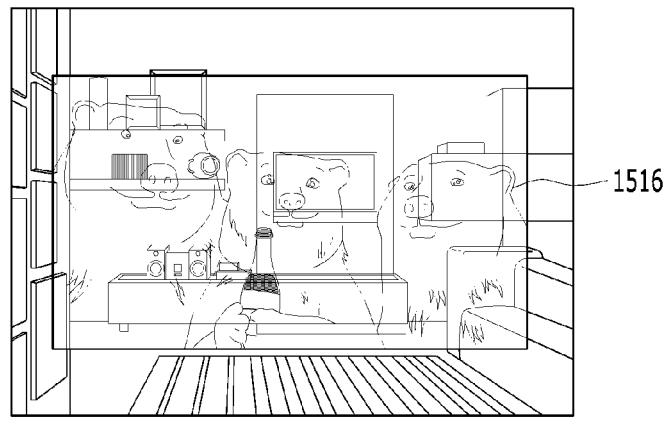
FIGS. 10(a) to 10(c) are diagrams illustrating an image focused on a light transmissive lens provided in a glass type mobile terminal in accordance with one embodiment of the present disclosure.
Figure 10B:
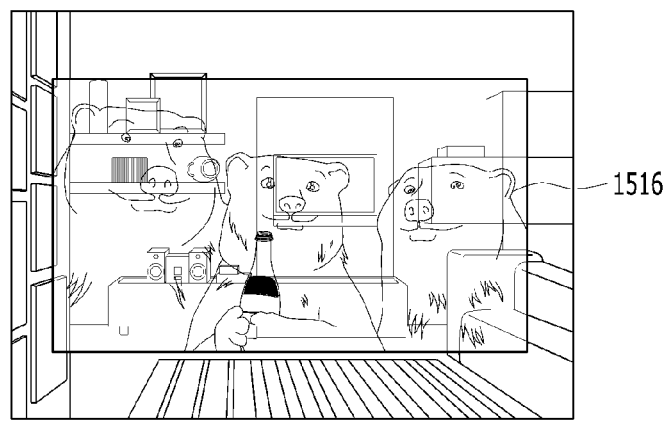
Figure 10C:
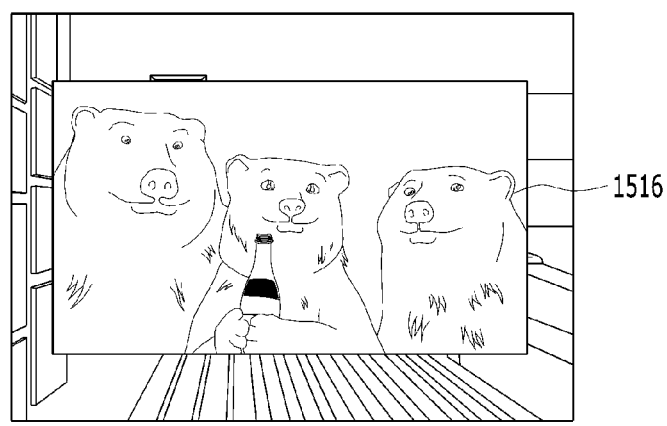

FIG. 10 is a diagram illustrating an image focused on the transparent screen 1515 based on control of the photo shutter 200 provided in the glass type mobile terminal 100 in accordance with one embodiment of the present disclosure. FIG. 10 (*a*) illustrates a screen shown at 80% of transparency. As the transparency of the photo shutter 300 is getting heightened more and more, an object located in front is seen overlapped with the image and the image 1516 is not seen clearly.

In FIG. 10, (b) seems more clearly than (a) and (c) shows a case in that the transparency is 0%. In (c), the image 1516 is seen clear, without being overlapped with the object located in front. In other words, the transparency of the front surface of the light transmissive lens 1511 is changed, using the photo shutter 200. The light drawn from the front surface may be blocked and the visibility of the image 1516 provided from the flanking projector 1510 may be enhanced. As shown in FIG. 10 (*c*), the photo shutter 200 is partially changed opaque and the portion not provided with the image may be controlled to make the object or scenery located in front seen.

Figure 11A:
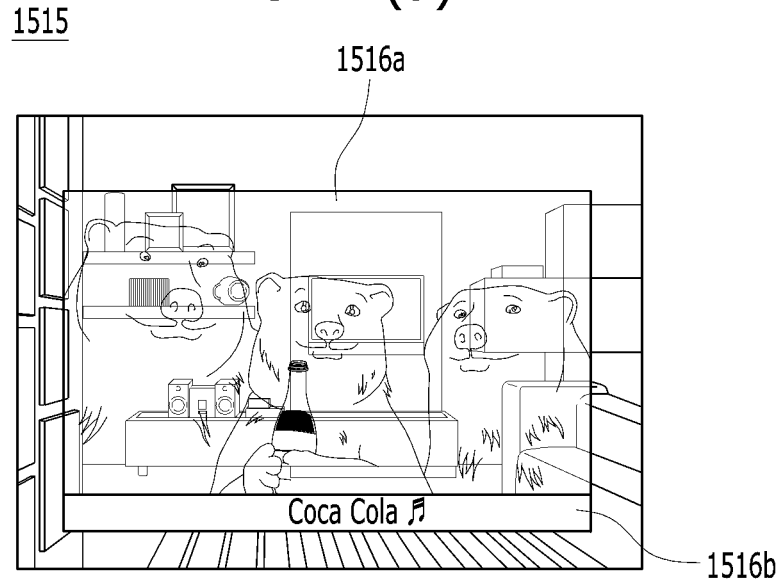
FIGS. 11(a) to 11(b) are diagrams illustrating an image focused on a light transmissive lens based on a control of a photo shutter provided in a glass type mobile terminal in accordance with one embodiment of the present disclosure.
Figure 11B:
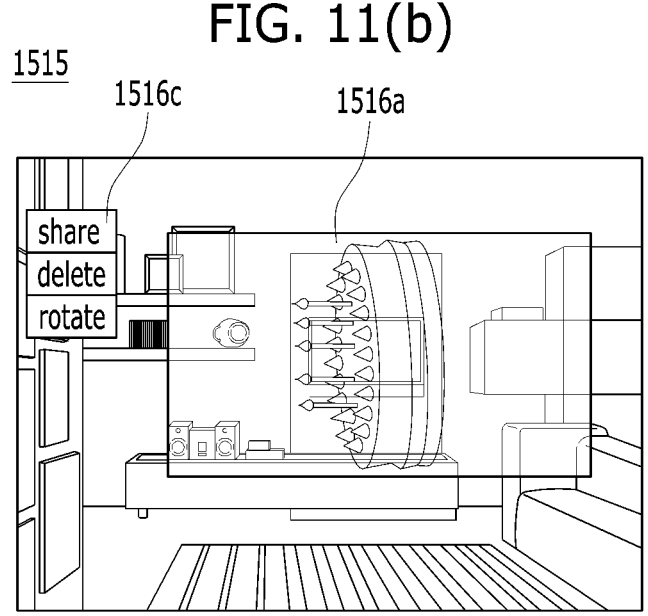

FIGS. 11(*a*) to 11(*b*) are diagrams illustrating the image focused on the light transmissive lens 1511 based on the control of the photo shutter 200 of the glass type mobile terminal 100 in accordance with the embodiment of the present disclosure. An image portion 1516*a* of the image has no great difficult in seeing the image, even with a lower visibility. However, a text portion 1516*b* such as subscription has difficulty in reading if the visibility is lowered.

Accordingly, it is necessary that the text portion (1516*b*, see FIG. 11 (*a*)) or a menu portion (1516*c*, see FIG. 11 (*b*)) should be seen clear for control, such that only a predetermined portion of the photo shutter 200 may be opaque to enhance the visibility partially.

The photo shutter 200 may change the transparency partially, after analyzing the image, or the user may determine the portion of the photo shutter 200 which will be changed to be opaque, using the touch sensor.

Figure 12:
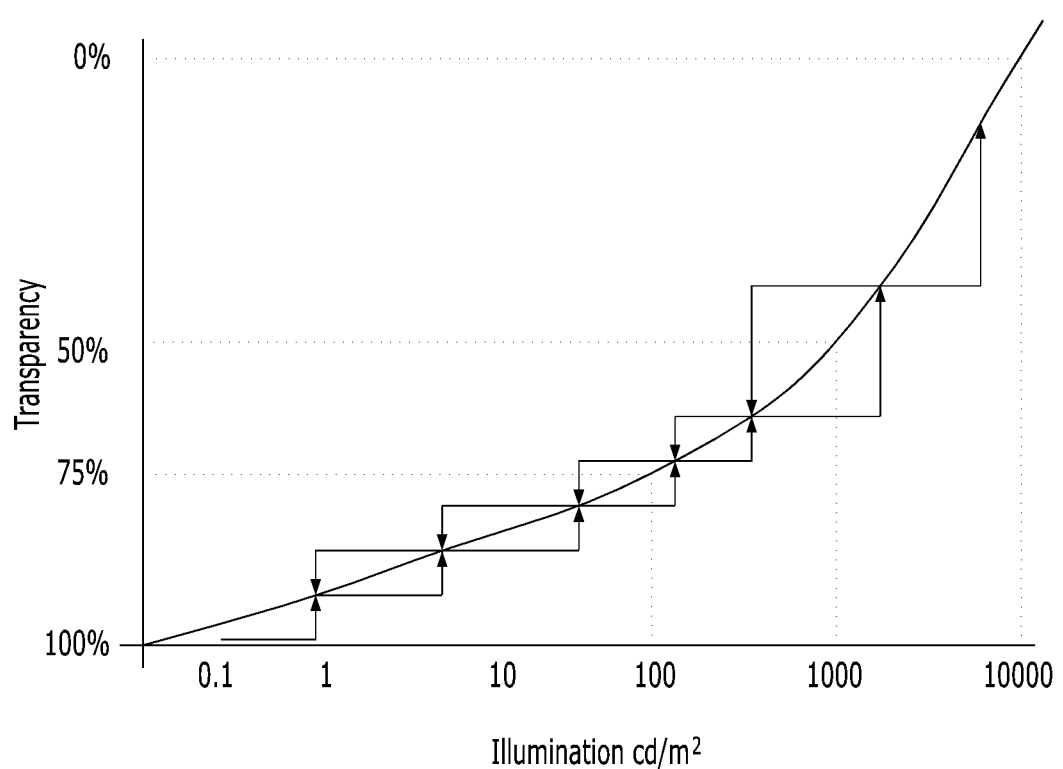
FIG. 12 is a graph illustrating a method for controlling a photo-shutter provided in a glass type mobile terminal in accordance with one embodiment of the present disclosure, with respect to external illumination.

FIG. 12 is a graph illustrating a method for controlling a photo-shutter provided in a glass type mobile terminal in accordance with one embodiment of the present disclosure, with respect to external illumination. A curve on the graph shows a transmittance degree based on external illumination. Even when the transmittance degree is high in a lower external illumination (or transparent), the image provided from the projector 1510 is seen clear. However, when the transmittance degree is low in a high external illumination (opaque), the image focused on the transparent screen 1510 is seen clear.

Accordingly, the transparency of the photo shutter 200 may be controlled based on the external illumination. In case the illumination is changed to a preset size or more for efficiency, the transparency may be changed and controlled in a stepped type. When the transmittance is changed even with small illumination change, the user can feel dizzy. It is preferred that the transmittance level is changed step by step, when the illumination is changed to a preset size or more.

As mentioned above, the visibility of the image focused on the light transmissive lens 1511 may be enhanced and a clear image may be seen even in a bright place.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glass type mobile terminal comprising:
   a band frame configured to be worn on a user's head;
   a light transmissive lens comprising a transparent screen on which an image is focused and coupled to the band frame such that the light transmissive lens is located in front the user's eyes;
   a projector configured to output the image;
   a photo shutter coupled to a front surface of the light transmissive lens and having a controllable transparency;
   a touch sensor configured to sense touch inputs;
   an acceleration sensor configured to sense movement of the terminal; and
   a controller configured to:
      control the projector to project the image toward the transparent screen from a lateral surface of the light transmissive lens;
      control the transparency of the photo shutter;
      increase the transparency of the photo shutter when the acceleration sensor senses movement after the transparency has been decreased; and
      decrease the transparency of the photo shutter when the acceleration sensor does not sense movement after the transparency has been increased,
   wherein the photo shutter comprises,
      a first transparent glass having a first transparent electrode layer formed on a first surface;
      a second transparent glass having a second transparent electrode layer formed on a second surface such that the second transparent electrode layer is spaced apart from the first transparent electrode layer;
      a liquid crystal layer formed by liquid crystals between the first and second transparent glass;
      a first polarizing plate coupled to the first transparent glass and configured to arrange light in a first direction; and
      a second polarizing plate coupled to the second transparent glass and configured to arrange light in a second direction vertical to the first direction,
   wherein at least the first transparent electrode layer or the second transparent electrode layer is used as a transparent electrode of both the photo shutter and touch sensor at the same time.

2. The glass type mobile terminal of claim 1, wherein the touch sensor is coupled to the front surface of the light transmissive lens.

3. The glass type mobile terminal of claim 2, wherein the controller is further configured to control the transparency of the photo shutter according to a number of the touches sensed by the touch sensor.

4. The glass type mobile terminal of claim 2, wherein the controller is further configured to separately control the transparency of a portion of the photo shutter where the touch sensor senses a touch input.

5. The glass type mobile terminal of claim 2, wherein the controller is further configured to control the photo shutter to:
  decrease the transparency when the touch sensor senses a touch and drag input in a first direction; and
  increase the transparency when the touch sensor senses a touch and drag input in a second direction.

6. The glass type mobile terminal of claim 2, wherein the projector comprises:
  a video output unit configured to project the image,
  wherein the transparent screen is tilted to transmit the image projected by the video output unit.

7. The glass type mobile terminal of claim 1, wherein the touch sensor comprises:
  at least the first transparent electrode layer or second transparent electrode layer; and
  a third transparent electrode layer formed on a surface of the photo shutter that is opposite a surface of the first polarizing plate,
  wherein the controller is further configured to detect a touch input by sensing change in capacitance between the first or second transparent electrode layer and the third transparent electrode layer.

8. The glass type mobile terminal of claim 1, wherein the controller is further configured to:
  control the photo shutter to change arrangement of the liquid crystals by applying a signal to the first and second transparent electrode layer at preset intervals; and
  detect a touch input by sensing a change in capacitance between the first and second transparent electrode layer.

9. The glass type mobile terminal of claim 1, wherein the photo shutter comprises PDLC (Polymer Dispersed Liquid Crystal).

10. The glass type mobile terminal of claim 1, further comprising:
  an illumination sensor configured to sense light,
  wherein the controller is further configured to control the transparency of the photo shutter according to illumination sensed by the illumination sensor.

11. The glass type mobile terminal of claim 10, wherein the controller is further configured to control the transparency at a rate according to a level of the sensed illumination.

12. The glass type mobile terminal of claim 1, wherein the controller is further configured to separately control the transparency of each of a plurality of portions of the photo shutter.

13. The glass type mobile terminal of claim 12, wherein the controller is further configured to control the photo shutter such that a text portion of the projected image has lower transparency than other portions of the projected image.

14. The glass type mobile terminal of claim 1, further comprising:
  a touch pad coupled to the band frame and configured to sense a touch input,
  wherein the controller is further configured to control the projector to include a pointer in the projected image and to move the pointer in response to the sensed touch input.

15. A method for controlling a glass type mobile terminal that is worn on a user's head and comprises a light transmissive lens comprising a transparent screen located in front the user's eyes on which an image is focused and a photo shutter coupled to the lens and having a controllable transparency, the method comprising:
  sensing a touch input via a touch sensor; and
  controlling the transparency of the photo shutter such that the transparency is changed according to at least a number of sensed touches or a direction of sensed touches,
  wherein the photo shutter comprises:
    a first transparent glass having a first transparent electrode layer formed on a first surface;
    a second transparent glass having a second transparent electrode layer formed on a second surface such that the second transparent electrode layer is spaced apart from the first transparent electrode layer;
    a liquid crystal layer formed by liquid crystals between the first and second transparent glass;
    a first polarizing plate coupled to the first transparent glass and configured to arrange light in a first direction; and
    a second polarizing plate coupled to the second transparent glass and configured to arrange light in a second direction vertical to the first direction,
  wherein at least the first transparent electrode layer or the second transparent electrode layer is used as a transparent electrode of both the photo shutter and touch sensor at the same time, and
  wherein controlling the transparency comprises:
  increasing the transparency when movement of the terminal is sensed after the transparency has been decreased; and
  decreasing the transparency when movement of the terminal is not sensed after the transparency has been increased.

16. The method of claim 15, wherein controlling the transparency further comprises separately controlling the transparency of a portion of the photo shutter where a touch input is sensed.

17. The method of claim 15, wherein controlling the transparency further comprises:
  decreasing the transparency when a touch is a touch and drag input is sensed in a first direction; and
  increasing the transparency when the touch is a touch and drag input is sensed in a second direction.

18. The method of claim 15, further comprising controlling the transparency according to illumination sensed by an illumination sensor.

* * * * *